(12) United States Patent
Nam

(10) Patent No.: US 10,469,902 B2
(45) Date of Patent: Nov. 5, 2019

(54) APPARATUS AND METHOD FOR CONFIRMING CONTENT VIEWING

(71) Applicant: Yang Woo Nam, Seoul (KR)

(72) Inventor: Yang Woo Nam, Seoul (KR)

(*) Notice: Subject to any disclaimer, the term of this patent is extended or adjusted under 35 U.S.C. 154(b) by 0 days.

(21) Appl. No.: 14/899,656

(22) PCT Filed: Jun. 5, 2014

(86) PCT No.: PCT/KR2014/004994
§ 371 (c)(1),
(2) Date: Dec. 18, 2015

(87) PCT Pub. No.: WO2014/204118
PCT Pub. Date: Dec. 24, 2014

(65) Prior Publication Data
US 2016/0165306 A1    Jun. 9, 2016

(30) Foreign Application Priority Data
Jun. 21, 2013 (KR) .................. 10-2013-0071339

(51) Int. Cl.
*H04N 21/433* (2011.01)
*H04N 21/442* (2011.01)
*H04N 21/81* (2011.01)
*H04N 21/466* (2011.01)
*H04N 21/4784* (2011.01)

(52) U.S. Cl.
CPC ... *H04N 21/44204* (2013.01); *H04N 21/4667* (2013.01); *H04N 21/4784* (2013.01); *H04N 21/812* (2013.01); *H04N 21/4331* (2013.01)

(58) Field of Classification Search
CPC .................................................. H04N 21/4331
See application file for complete search history.

(56) References Cited

U.S. PATENT DOCUMENTS

| | | | |
|---|---|---|---|
| 2011/0067045 A1* | 3/2011 | Matheny | G06Q 30/0226 725/13 |
| 2012/0079521 A1* | 3/2012 | Garg | G06Q 30/02 725/23 |
| 2012/0158513 A1* | 6/2012 | Schoen | G06Q 30/0269 705/14.66 |
| 2012/0232986 A1* | 9/2012 | Baiz Matuk | G06Q 30/00 705/14.44 |

* cited by examiner

*Primary Examiner* — Michael H Hong
(74) *Attorney, Agent, or Firm* — John K. Park; Park Law Firm

(57) ABSTRACT

The present invention relates to a system and method for checking the viewing of content. The system includes: an operating computer including a means for storing at least one piece of combined content, in which first content and at least one piece of second content are combined, and a means for providing a benefit set for the combined content; and a user program including a content viewer means for playing back the combined content, and a signal input means for receiving at least one signal from a viewer when the second content is exposed in the combined content being played back via the content viewer means, and being executed on a user terminal; wherein the operating computer provides the benefit in connection with information of the viewer based on data generated based on the information of the signal transmitted from the user terminal and input to the signal input means.

16 Claims, 8 Drawing Sheets

FIG. 5
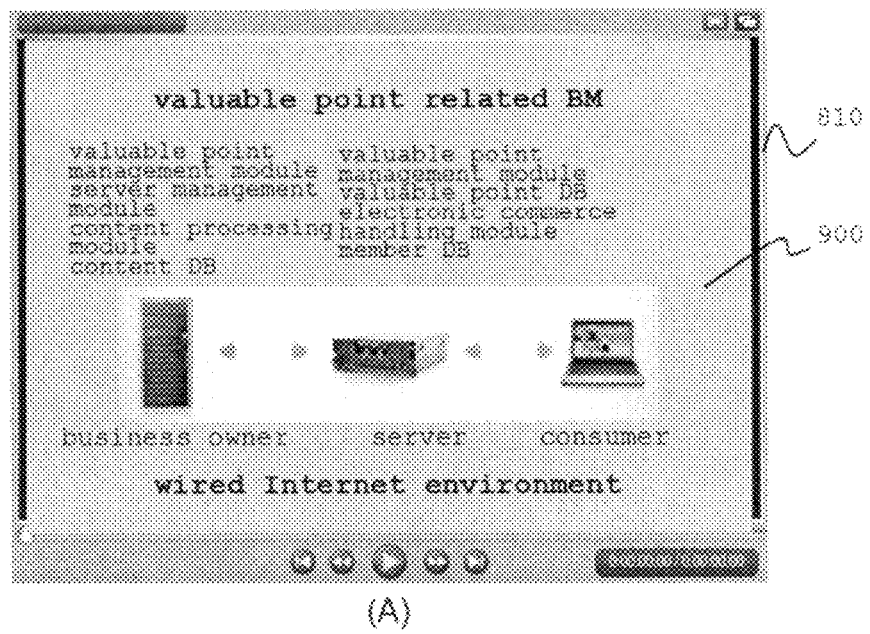
(A)
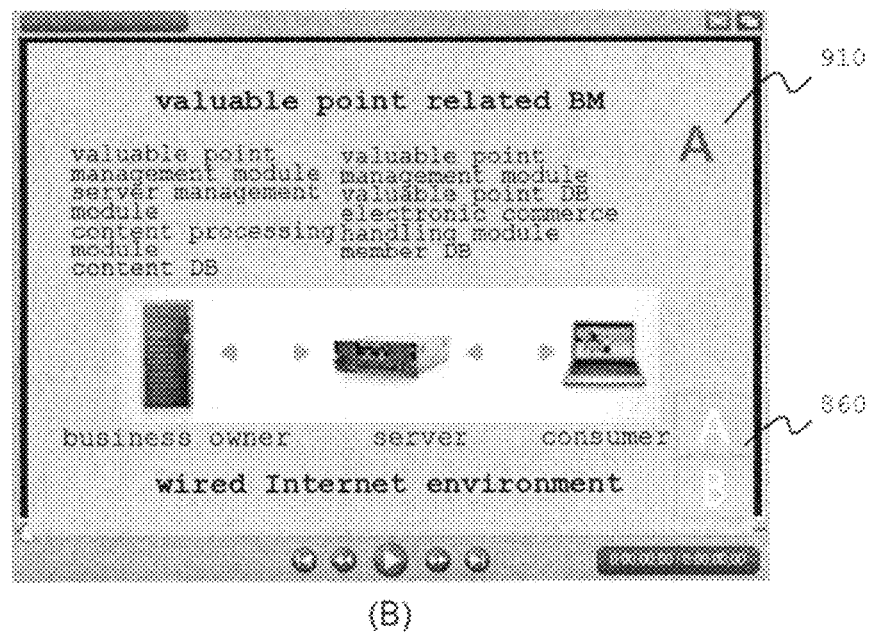
(B)

FIG. 6
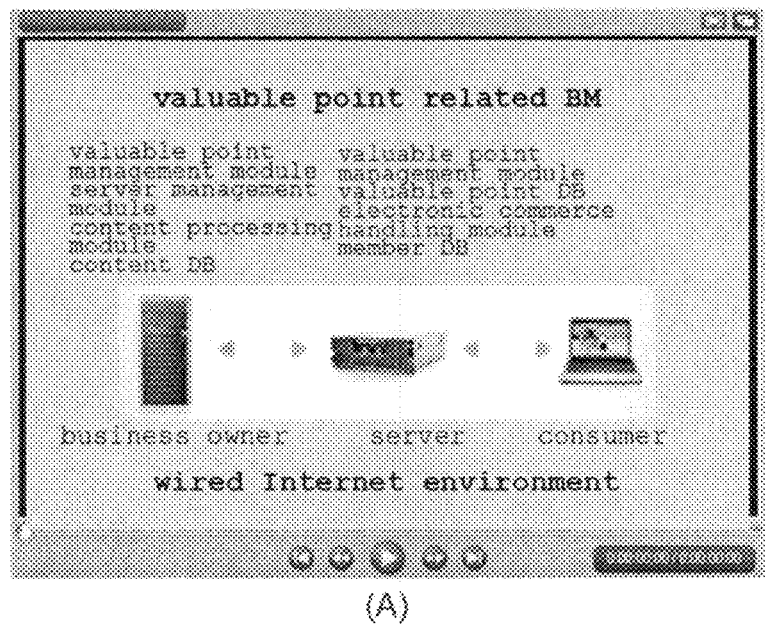
(A)
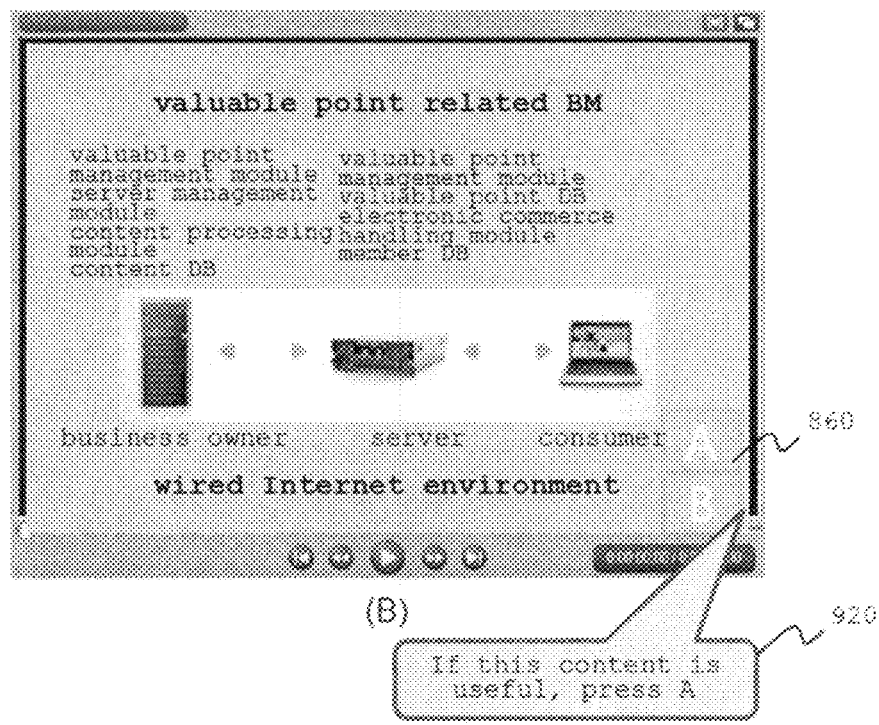
(B)

APPARATUS AND METHOD FOR CONFIRMING CONTENT VIEWING

TECHNICAL FIELD

The present invention relates to a system and method for checking the viewing of content. More particularly, the present invention relates to a system and method for providing a benefit when a user has viewed content, provided to a client terminal over a wired/wireless network, from the start of the content to the end thereof and checking the viewing of content of the user.

BACKGROUND ART

There have been widely used systems and methods for providing a benefit when content, such as an advertisement, is viewed. For example, there has been developed and used an advertising system and method for providing a bonus to a user based on the time during which advertising content provided to a user terminal is viewed. However, this system has a problem in that the advertising effect thereof cannot be trusted because it cannot be determined whether a user has actually viewed the advertising content. As an invention for solving the above problem, Korean Patent No. 10-1061952 (registered on Aug. 29, 2011) entitled "Advertisement Reward System and Method for Checking Viewing of Real-time Advertisement of User and Providing Reward" is disclosed.

The patented invention is directed to an advertisement reward system and method that, in order to check whether a user who is viewing an advertisement is actually viewing the advertisement, determines the user to be a user who is actually viewing the advertisement when the former user inputs a real-time response corresponding to an instruction within a limited period of time and provides a reward to the user. The patented invention is configured to include: means for defining the type of reward; means for defining an instruction; means for defining a limited period of time for input; means for defining a valid response; means for generating interface information for displaying an interface window; means for transmitting the interface information while advertisement data is being transmitted to a user terminal, means for, when a user inputs response data after the user terminal displays the interface information in an interface window, receiving response information from the user terminal and storing a total participation count and a valid response count for each user; and means for accumulating a reward corresponding to the type of reward for a user who has made a valid response corresponding to the instruction within the limited period of time. This invention is characterized in that the limited period of time is set such that only a user who is actually immersed in the viewing of an advertisement with continuity and concentration can respond to an instruction to request a predetermined response in order to check whether a user is actually viewing an advertisement. This invention is characterized in that a sincere viewer is assumed to submit a valid response within the limited period of time, the user is considered to be a valid viewer, and a predetermined reward is provided to the valid viewer.

According to the patented invention, an advertising server generates and stores interface information regarding an advertisement or generates interface information in real time in response to a request for an advertisement and transmits the interface information to a user terminal via which the a user is viewing an advertisement, and the user terminal displays the received interface information in an interface window. When the advertisement is a moving image, a problem arises in that the load of a network is increased because interface information containing a large amount of data is transmitted to the user terminal in real time in the state in which a heavy load has occurred in the network due to the provision of Internet streaming. Furthermore, a problem arises in that the load of a network is increased because the response data of the user based on the instruction is transmitted from the user terminal to the advertising server in real time.

Furthermore, it is necessary to understand and respond to the instruction within the limited period of time during the viewing of the advertisement, and thus the user focuses his or her eyes on the interface window in order to enter a correct response when the interface information is displayed on the interface window. Accordingly, a problem arises in that the user is obstructed in the concentrated viewing of the advertisement.

Therefore, there is a need for an invention regarding a system and method for checking the viewing of content, which do not increase the load of a network and do not detract from concentration on the viewing of an advertisement.

DISCLOSURE

Technical Problem

The present invention is intended to overcome the above-described problems of the conventional technology, and an object of the present invention is to provide a system for checking the viewing of content, which, in a system for checking the viewing of content, such as an advertisement, provided over a network, do not increase the load of a network and do not detract from the concentration of a viewer on the viewing of content.

Technical Solution

As a technical solution for the accomplishment of the above object, in accordance with a first aspect of the present invention, there is proposed a system for checking the viewing of content, including: an operating computer configured to store and Manage the information of a user program to be provided to a user terminal, combined content, in which first content and at least one piece of second content are combined, to be provided to the user terminal, the information of the combined content, information about a member who views the combined content, and the bonus information of the member; and at least one user terminal configured to store a user program, including: a content viewer means communicatively connected to the operating computer and configured to play back the combined content provided by the operating computer; a signal input means configured to receive a signal when the at least one piece of second content combined with the first content is exposed while the combined content is being played back; a means configured to receive the signal input to the signal input means, and to generate data, including the member information (or the identification information of the user program or information about the user terminal) and the identification information of the combined content, and a means configured to transmit the generated data to the operating computer;

wherein the operating computer accumulates a set bonus in connection with the member information based on the data transmitted from the user terminal.

Furthermore, in accordance with a second aspect of the present invention, there is proposed a system for checking the viewing of content, including an operating computer configured to provide combined content to a user program displayed on a user terminal, thereby playing back the combined content, wherein the user program includes: a content viewer means configured to play back the combined content transmitted from the operating computer; a second content exposure monitoring means configured to check the time during which at least one piece of second content is exposed while the combined content is being played back via the content viewer means; a signal input means configured to receive a signal when the at least one piece of second content is exposed; and a data generation means configured to receive the signal input to the signal input means, and to, if information about the at least one piece of second content included in the combined content and the input signal match each other, generate data, including the information about the at least one piece of second content, the member information (or the identification information of the user program or information about the user terminal) and the identification information of the combined content; and wherein the operating computer includes: a combined content management means configured to store and manage at least one piece of combined content, in which first content and at least one piece of second content are combined, to be provided to the user terminal, and combined content information; and a bonus management means configured to receives the information about the at least one piece of second content information included in data transmitted from the user terminal user program while the combined content is being played back, and to store and manage a set bonus in connection with the member information (or the identification information of the user program or the information about the user terminal).

Furthermore, in accordance with a third aspect of the present invention, there is proposed a method for checking the viewing of content, including: receiving, by an operating computer, a request for combined content, in which first content and at least one piece of second content are combined, transmitted from a user terminal; transmitting the combined content, requested by the user terminal, to the user terminal, thereby playing back the combined content via the content viewer means of the user terminal; recognizing, by the user terminal, combined content information, including the identification information of the combined content, the combination location information of the second content and the identification information of the second content included in the combined content; displaying, by the user terminal signal, an input means based on the combination location information of the second content; receiving, by the user terminal, a signal input to the signal input means; determining, by the user terminal, whether the recognized identification information of the second content and the signal input to the signal input means match each other by comparing them; if the identification information of the second content and the signal input to the signal input means match each other, generating, by the user terminal, data, including the identification information of the combined content, user identification information composed of one of member information, the identification information of a user program and the identification information of the user terminal, and information about whether the identification information of the second content and the signal input to the signal input means match each other; transmitting, by the user terminal, the generated data to the operating computer; and providing, by the operating computer, a benefit, set for the combined content, in connection with the user identification information based on the information about whether the identification information of the second content and the signal input to the signal input means match each other, which is included in the data transmitted from the user terminal.

Furthermore, in accordance with a fourth aspect of the present invention, there is proposed a method for checking viewing of content, including: receiving, by an operating computer, a request for combined content, in which first content and at least one piece of second content are combined, transmitted from a user terminal; transmitting the combined content, requested by the user terminal, to the user terminal, thereby playing back the combined content via a content viewer means of the user terminal; recognizing, by the user terminal, combined content information, including the identification information of the combined content, the combination location information of the second content and the identification information of the second content included in the combined content; activating, by the user terminal signal, the signal input means based on the recognized combination location information of the second content so that a signal can be input to the signal input means displayed along with the convent viewer means; receiving, by the user terminal, a signal input to the signal input means; determining, by the user terminal, whether the recognized identification information of the second content and the signal input to the signal input means match each other by comparing them; if the identification information of the second content and the signal input to the signal input means match each other, generating, by the user terminal, data, including the identification information of the combined content, user identification information composed of one of member information, the identification information of a user program and the identification information of the user terminal, and information about whether the identification information of the second content and the signal input to the signal input means match each other, transmitting, by the user terminal, the generated data to the operating computer, and providing, by the operating computer, a benefit, set for the combined content, in connection with the user identification information based on the information about whether the identification information of the second content and the signal input to the signal input means match each other, which is included in the data transmitted from the user terminal.

Furthermore, in accordance with a fifth aspect of the present invention, there is proposed a method for checking viewing of content, including: receiving, by an operating computer, a request for combined content, in which first content and at least one piece of second content are combined, transmitted from a user terminal; transmitting the combined content, requested by the user terminal, to the user terminal, thereby playing back the combined content via a content viewer means of the user terminal; recognizing, by the user terminal, combined content information, including the identification information of the combined content and the combination location information of the second content included in the combined content; displaying, by the user terminal signal, an input means based on the combination location information of the second content; receiving, by the user terminal, signals input to the signal input means, and transmitting, by the user terminal, the received signals to the operating computer when a final signal is input; determining, by the operating computer, whether information about the signals transmitted from the user terminal and the stored identification information of the second content of the combined content match each other by comparing them; and, if the identification information of the second content and the information about the signals match each other, providing, by the operating computer, a benefit, set for the combined content, in connection with the user identification information.

Furthermore, in accordance with a sixth aspect of the present invention, there is proposed a method for checking viewing of content, including: receiving, by an operating computer, a request for combined content, in which first content and at least one piece of second content are combined, transmitted from a user terminal; transmitting the combined content, requested by the user terminal, to the user terminal, thereby playing back the combined content via a content viewer means of the user terminal; recognizing, by the user terminal, combined content information, including the identification information of the combined content and the combination location information of the second content included in the combined content; activating, by the user terminal signal, the signal input means based on the combination location information of the second content so that signals can be input to the signal input means displayed along with the convent viewer means; receiving, by the user terminal, signals input to the signal input means, and transmitting, by the user terminal, the received signals to the operating computer when a final signal is input; determining, by the operating computer, whether information about the signals transmitted from the user terminal and the stored identification information of the second content of the combined content match each other by comparing them; and, if the identification information of the second content and the information about the signals match each other, providing, by the operating computer, a benefit, set for the combined content, in connection with the user identification information.

Advantageous Effects

According to the present invention, a system and method for checking the viewing of content, such as an advertisement or the like, provided over a network have advantageous effects in that the load of a network is not increased because an operating computer does not transmit data adapted to check the viewing of content during the playback of content in a user terminal, and in that the viewing of content can be efficiently checked without detracting from the concentration of a viewer on the viewing of content because a user is allowed to input a signal after viewing or listening to a simple mark or voice included and exposed in combined content.

DESCRIPTION OF DRAWINGS

FIG. 5 is a schematic configuration diagram of embodiments of the content viewer and combined content of the user program that is an important component of the embodiment of the system for checking the viewing of content according to the present invention;

FIG. 6 is a schematic configuration diagram of other embodiments of the content viewer and combined content of the user program that is an important component of the embodiment of the system for checking the viewing of content according to the present invention;

MODE FOR INVENTION

Embodiments of the present invention will be described in detail below with reference to the accompanying drawings.

Figure 1:
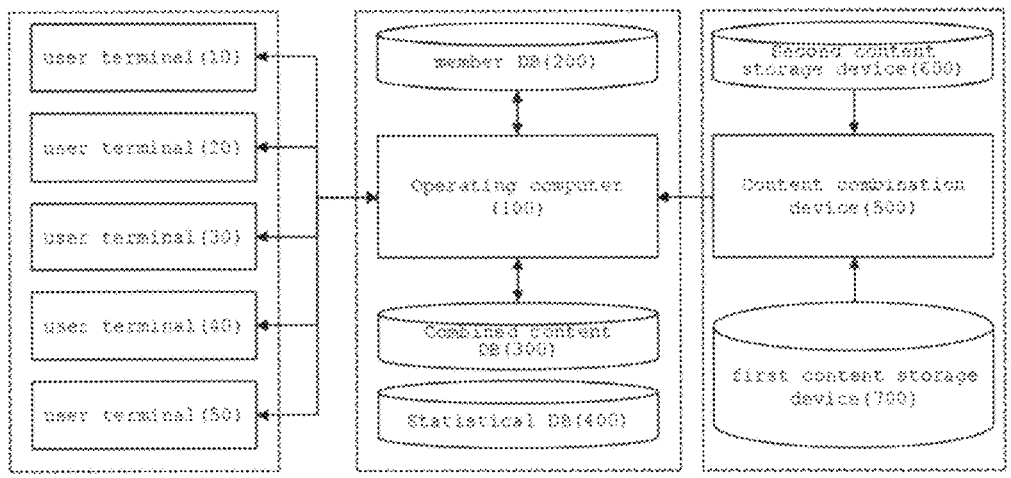
FIG. 1 is a schematic configuration diagram of an embodiment of a system for checking the viewing of content according to the present invention.

FIG. 1 is a schematic configuration diagram of an embodiment of a system for checking the viewing of content according to the present invention. As shown in FIG. 1, the system for checking the viewing of content according to the present invention is configured to include: an operating computer 100 configured to manage the identification information of a user program provided to at least one user terminal, at least one piece of combined content information, in which first content and at least one piece of second content are combined, to be provided to the user terminal, information about a member who views the combined content, and the bonus information of the member; a member DB 200 included in the operating computer 100 or communicatively connected to the operating computer 100, and configured to store the information about the member who is registered in the operating computer 100 as a member and who receives a bonus; a combined content DB 300 included in the operating computer 100 or communicatively connected to the operating computer 100, and configured to include the at least one piece of combined content information in which the first content and the at least one piece of second content are combined; a statistical DB 400 included in the operating computer 100 or communicatively connected to the operating computer 100, and configured to store per combined content-based rating statistics and bonus statistics; at least one user terminal 10 to 50 configured such that the user program is stored and executed, and communicatively connected to the operating computer 100; a content combination device 500 configured to combine the first content and the at least one piece of second content that are provided to the user terminal 10 and 50, and to transmit the combined content to the operating computer 100; a first content storage device 700 included in the content combination device 500 or communicatively connected to the content combination device 500, and configured to store the at least one piece of first content; and a second content storage device 600 configured to store the at least one piece of second content provided to be combined with the first content.

The user terminal 10 to 50 includes various terminals in which a communication means is included and a user program is downloaded, installed, stored and executed in response to an execution command of a user. The user terminal 10 to 50 may include mobile communication terminals including a smart phone, a tablet PC, a PC, a notebook computer, a digital TV, a smart TV, etc.

Furthermore, the user program that is installed on the user terminal 10 to 50 is an application program, and is stored in the operating computer 100 or in a separate application program download server. A configuration may be made such that the user terminal 10 to 50 can connect to the operating computer 100 or application program download server and then download the user program.

Furthermore, the content combination device 500 may be configured to combine at least one piece of second content with first content, i.e., the main content of an advertisement or the like, at the predetermined location of the first content using various data image combination methods.

Furthermore, the first content may be composed of image or moving image content, such as an advertisement having a predetermined size or the like, which will be played back via the user program of the user terminal 10 to 50.

Furthermore, the second content may be configured to include at least one text, image, moving image or voice combined with the predetermined one of the frames of the first content.

Figure 2:
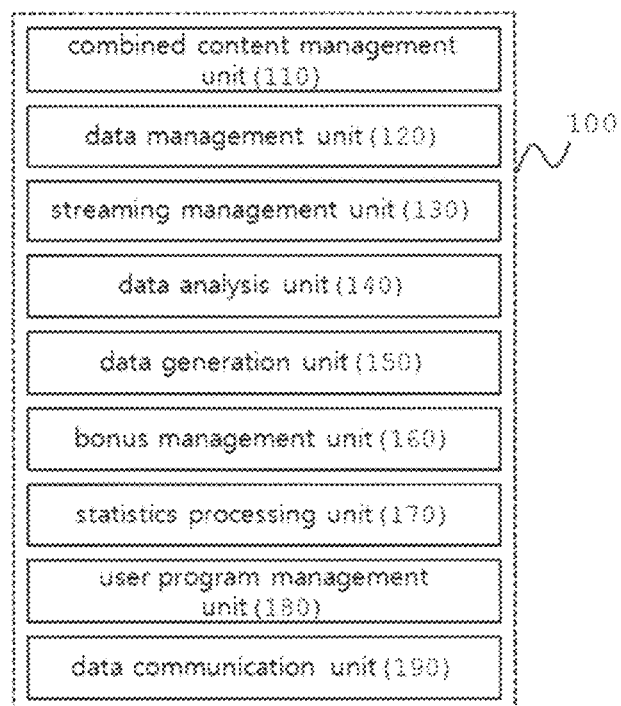
FIG. 2 is a schematic configuration diagram of an embodiment of the operating computer that is an important component of the embodiment of the system for checking the viewing of content according to the present invention.

FIG. 2 is a schematic configuration diagram of an embodiment of the operating computer that is an important component of the embodiment of the system for checking the viewing of content according to the present invention. As shown in FIG. 2, the operating computer of the present invention is configured to include: a combined content management unit 110 configured to manage at least one piece of combined content, in which first content and at least one piece of second content is combined, to be provided to the user terminal, and the information of the combined content; a data management unit 120 configured to receive and store data about a rating regarding the combined content transmitted from the user terminal; a streaming management unit 130 configured to provide a streaming service regarding the combined content requested by the user terminal; a data analysis unit 140 configured to receive information related to the at least one piece of second content of the combined content transmitted from the user terminal, and to analyze whether there is a match by comparing with information about the at least one piece of second content included in the information of the combined content, a data generation unit 150 configured to, if, as a result of the analysis of the data analysis unit 140, the information about the at least one piece of second content matches, generate data, including the identification information of the combined content, information about the matching of the at least one piece of second content, and user identification information composed of one of the identification information of the user terminal, member information, and the identification information of the user program; a bonus management unit 160 configured to query a set bonus based on the identification information of the combined content and the information about the matching of the at least one piece of second content included in the data generated by the data generation unit 150, and to accumulate the retrieved bonus in connection with the user identification information; a statistics processing unit 170 configured to process rating statistics regarding the at least one piece of combined content, viewer analysis statistics, bonus statistics, etc.; a user program management unit 180 configured to store and manage a user program, provided to the at least one user terminal, the identification information of the user program, etc.; and a data communication unit 190 configured to transmit and receive data to and from the at least one user terminal.

Figure 3:
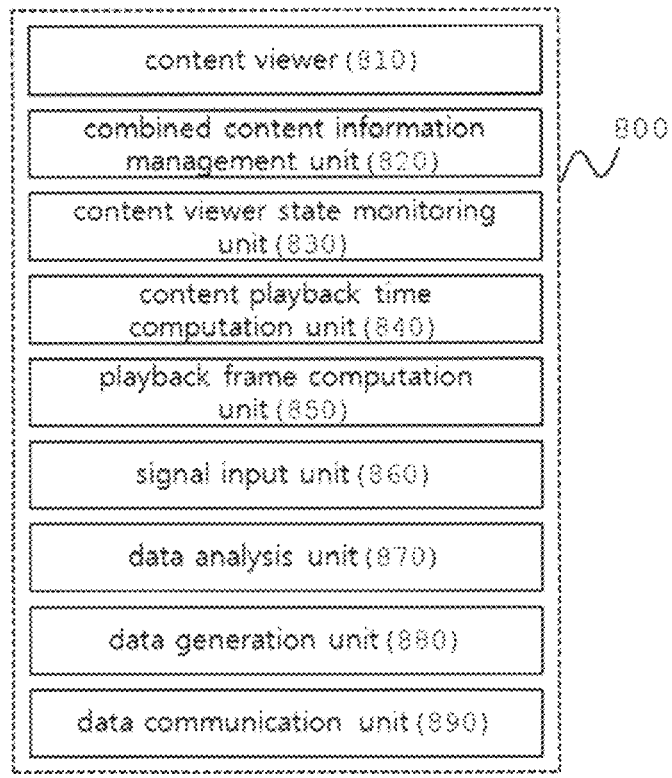
FIG. 3 is a schematic configuration diagram of an embodiment of the user program that is an important component of the embodiment of the system for checking the viewing of content according to the present invention.

FIG. 3 is a schematic configuration diagram of an embodiment of the user program that is an important component of the embodiment of the system for checking the viewing of content according to the present invention. As shown in FIG. 3, the user program 800 of the present invention is configured to include: a content viewer 810 configured to execute the streaming of combined content transmitted by the operating computer 100; a combined content information management unit 820 configured to extract and store combined content information, such as the identification information of combined content included in the combined content transmitted by the operating computer 100, the identification information of at least one piece of second content, information about the location of the first content where the at least one piece of second content has been combined, the bonus information of the first content, etc.; a content viewer state monitoring unit 830 configured to monitor the execution state of the content viewer 810; a content playback time computation unit 840 configured to compute the playback time of combined content according to the monitoring information of the content viewer state monitoring unit 830; a playback frame computation unit 850 configured to compute the current image frame of the combined content being played back; a signal input unit 860 configured to receive a signal from a viewer when at least one piece of second content included in the combined content is exposed; a data analysis unit 870 configured to determine whether a signal input to the signal input unit and the identification information of the at least one piece of second content stored in the combined content information management unit 820 match each by comparing them; a data generation unit 880 configured to, if, as a result of the analysis of the data analysis unit 870, the input signal and the at least one piece of second content information match each other, generate data, including user identification information composed of one of the identification information of the combined content, information about whether the input signal and the at least one piece of second content match each other and the identification information of the user terminal, the member information, and the identification information of the user program; and a data communication unit 890 configured to transmit the generated data to the operating computer.

Figure 4:
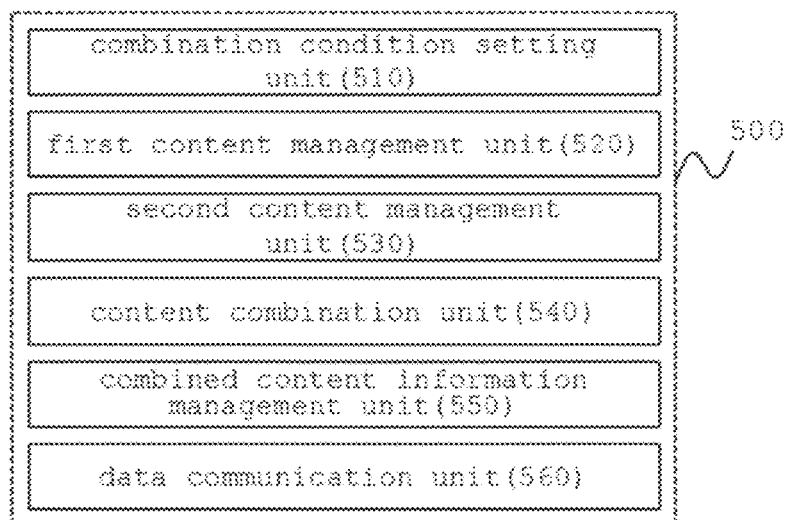
FIG. 4 is a schematic configuration diagram of an embodiment of the content combination device that is an important component of the embodiment of the system for checking the viewing of content according to the present invention.

FIG. 4 is a schematic configuration diagram of an embodiment of the content combination device that is an important component of the embodiment of the system for checking the viewing of content according to the present invention. As shown in FIG. 4, the content combination device 500 of the present invention is configured to include: a combination condition setting unit 510 configured to set conditions under which first content, such as advertising moving image content or the like, is combined with second content, such as the location of the first content where the second content will be combined, the number of pieces of second content to be combined, and the type of second content to be combined (a text image, a voice, a moving image, or the like); a first content management unit 520 configured to fetch the first content, such as advertising moving image content or the like, from the first content storage device and to assign bonus information or the like; a second content management unit 530 configured to fetch the corresponding second content from the second content storage device while referring to the conditions set by the combination condition setting unit 510 and to assign identification information to each piece of second content; a content combination unit 540 configured to combine the at least one piece of second content fetched by the second content management unit 530 with the first content fetched by the first content management unit 520 while referring to the information set by the combination condition setting unit 510, and to assign identification information to combined content; a combined content information management unit 550 configured to extract combined content information composed of the identification information of the combined content, the identification information of the at least one piece of second content, information about the location of the combined content where the second content has been combined, the bonus information of the first content, etc. from the combined content obtained by the content combination unit 540, and to store the combined content and the combined content information; and a data communication unit 560 configured to transmit the combined content and the combined content information to the operating computer 100.

The system for checking the viewing of content according to the present invention is described in greater detail with reference to FIGS. 1 to 4. The content combination device 500 generates combined content that will be provided to the user terminal by the operating computer 100. The combination condition setting unit 510 sets combination conditions under which first content composed of specific advertising moving image content and at least one piece of second content composed of an image, a voice or a moving image are combined with each other. The combination conditions include information about, for example, the type of second content to be combined, the number of pieces of second content to be combined, the location of the first content where the second content will be combined, etc. Furthermore, the setting information may be input by an administrator, or setting data may be determined according to the information of the first content in advance. Furthermore, the combination condition setting unit 510 may set conditions as desired. For example, second content, i.e., an image composed of one alphabetical letter, may be combined in the start and end portions of first content during the playback of the first content, and one piece of second content composed of a voice file may be combined in the middle of first content. The combination location may be set based on the number of frames or playback time information in a normal playback state when first content is a moving image. Furthermore, it may be possible to determine the frame information of first content, to determine the color information (brightness information) of an image corresponding to a frame at a set combination location, and to set the color of second content to be combined.

Furthermore, the first content management unit 520 may fetch specific first content from the first content storage device 700 that stores first content composed of advertising moving image content or the like, and may assign bonus information set for the first content. The second content management unit 530 fetches second content, corresponding to the combination conditions set by the combination condition setting unit 510, from the second content storage device 600, and assigns identification information to each piece of second content. The content combination unit 540 combines the first content and the second content while referring to the conditions set by the combination condition setting unit 510. A method of combining second content with first content may be configured such that when the second content is an image having a single alphabetical letter, the second content is combined with frames at the combination locations of the first content, for example, 500th to 560th frames, at the same location, and the combined second content is exposed for two seconds when the first content is played back. Furthermore, the method of combining second content with first content may be configured such that when the second content is a voice file, the audio sections of the first content are recognized and the second content is inserted into sections in which there is no audio signal or an unimportant audio signal is present. Furthermore, when second content is a moving image, the second content is combined with first content so that the second content is played back while overlapping a specific section of the first content.

The complete combined content includes combined content information composed of the identification information of the combined content, the identification information of the second content, and the location information of the second content. Furthermore, the combined content information may include the bonus information of the first content.

Furthermore, although the combined content is generated using the content combination device 500, the generation of the combined content is not limited thereto. The first content and the at least one piece of second content may be combined using an image editing program in a PC or the like.

The generated at least one piece of combined content and combined content information are stored in the operating computer 100 or combined content DB 300.

The at least one user terminal communicatively connects to the operating computer 100 or application program download server, and downloads and installs a user program. In this case, the installation means that the user program is stored in the storage unit of the user terminal and is executed on the user terminal in response to an execution command of the user terminal.

When the user program is executed on the user terminal in which the user program is installed, a communicative communication may be made to the operating computer 100, and a combined content list may be received and searched for. The operating computer 100 having received a request for the transmission of specific combined content from the user program of the user terminal searches for the requested combined content, and provides a streaming service regarding the combined content to the user terminal via the streaming provision unit 130. The combined content information management unit 820 of the user program extracts and stores combined content information included in the combined content while the combined content is being received from the operating computer 100 or while the combined content is being played back via the content viewer 810. When information about the location of the second content included in the combined content information corresponds to playback time, the content playback time computation unit 840 may be configured to compute playback time, to expose the signal input unit 860 at the predetermined location of the content viewer 810, and to make the signal input unit 860 disappear from the content viewer 810 when, before or after the second content disappears. When the second content is exposed the second or third time, the same configuration may be made.

Furthermore, when the location information of the second content included in the combined content information corresponds to frame information, the playback frame computation unit 850 may be configured to compute a current playback frame, to expose the signal input unit 860 at the predetermined location of the content viewer 810 in a frame where the first second content starts to be exposed or in a frame after or before a few frames, and to make the signal input unit 860 disappear from the content viewer 810 when or after the second content disappears. When the second content is exposed the second or third time, the same configuration may be made.

Furthermore, the display location of the signal input unit 860 is not limited thereto, and the signal input unit 860 may be displayed in an area separate from the content viewer 810.

FIG. 5 is a schematic configuration diagram of embodiments of the content viewer and combined content of the user program that is an important component of the embodiment of the system for checking the viewing of content according to the present invention.

FIG. 5(A) shows an example in which the combined content 900 is played back via the content viewer 810, and FIG. 5(B) shows an example in which the second content 910 composed of a combined digital letter image is exposed in the combined content 900 and the signal input unit 860 is displayed.

FIG. 6 is a schematic configuration diagram of other embodiments of the content viewer and combined content of the user program that is an important component of the embodiment of the system for checking the viewing of content according to the present invention.

FIG. 6(A) shows an example in which the combined content 900 is played back via the content viewer 810, and FIG. 6(B) shows an example in which the second content 920 composed of a combined digital voice is output in the combined content 900 and the signal input unit 860 is displayed.

The signal input unit 860 is configured such that a user makes a selection and performs a touch input or a signal is input through mouse input.

Furthermore, when the content viewer 810 is executed, the signal input unit 860 is configured to be always displayed at the predetermined location of the content viewer 810 or in a separate area. In this case, the signal input unit 860 is configured to be activated in terms of a program and also enable signal input only when the second content is exposed.

The content viewer state monitoring unit 830 and content playback time computation unit 840 of the user program 800 are components that are required when the combination location information of the second data included in the combined content information corresponds to playback time. The content viewer state monitoring unit 830 is a component that monitors a state when combined content is not normally played back via the content viewer 810 due to the state of the user terminal or network communication. When a problem in which the playback of combined content is slowed down or is stopped and resumed occurs due to a problem of the user terminal or a network communication service provider, the content viewer state monitoring unit 830 detects the occurrence of the problem by referring to the location information of the second content. The content playback time computation unit 840 becomes aware of the detection of the problem of the content viewer state monitoring unit 830, computes slowed down time based on normal playback time, and delays the exposure of the signal input unit 860 by the computed time, thereby matching the delayed exposure with the time at which second content needs to be exposed in the combined content. Furthermore, in the case where the signal input unit 860 is displayed in the content viewer 810 or a separate area when the content viewer 810 is executed, the activation time of the signal input unit 860 may be matched with the second content.

In the embodiments of FIGS. 5 and 6, button A and button B of the signal input unit 860 are configured to input selected signal A and signal B when a viewer selects button A and button B. Furthermore, it may be possible to activate only a button corresponding to the second content exposed in combined content by referring to the identification information of the second content included in the combined content. For example, a configuration may be made such that only button A of buttons A and B of the signal input unit 860 corresponding to the second content exposed in the combined content is activated in terms of a program. In the case where the above configuration is made, the configuration of the data analysis unit 870 may be omitted.

When the second content is exposed in the played back combined content, a viewer inputs a signal by selecting button A or button B of the signal input unit 860. The data analysis unit 870 analyzes whether the input signal matches the identification information of the second content included in the combined content information by comparing them. If the input signal matches the identification information of the second content included in the combined content information, the data generation unit 880 generates data, including the identification information of the combined content included in the combined content information, user identification information and second content matching information. The data communication unit 890 transmits the generated data to the operating computer 100. It is preferred that the time at which the data communication unit 890 transmits data to the operating computer 100 be the time that follows after the exposure of a plurality of pieces of second content has been terminated in the case where the number of pieces of second content included in the combined content is plural, or the time that follows immediately after the playback of combined content has been terminated or a playback-disabled state has been entered.

The operating computer 100 receives the data transmitted from the user terminal, and the bonus management unit 160 fetches bonus information set based on the identification information of combined content included in the data, and accumulates the bonus information in connection with the user identification information. The statistics processing unit 170 processes and stores rating statistics regarding the combined content, viewer statistics, such as the age, gender and the like of a viewer, cumulative bonus statistics, etc., the user identification information and the bonus information while referring to the identification information of the combined content.

Furthermore, the operating computer 100 may be configured to transmit the cumulative bonus information, accumulated in connection with the user identification information, to the user terminal, thereby allowing the cumulative bonus information to be displayed in the user Program.

Figure 7:
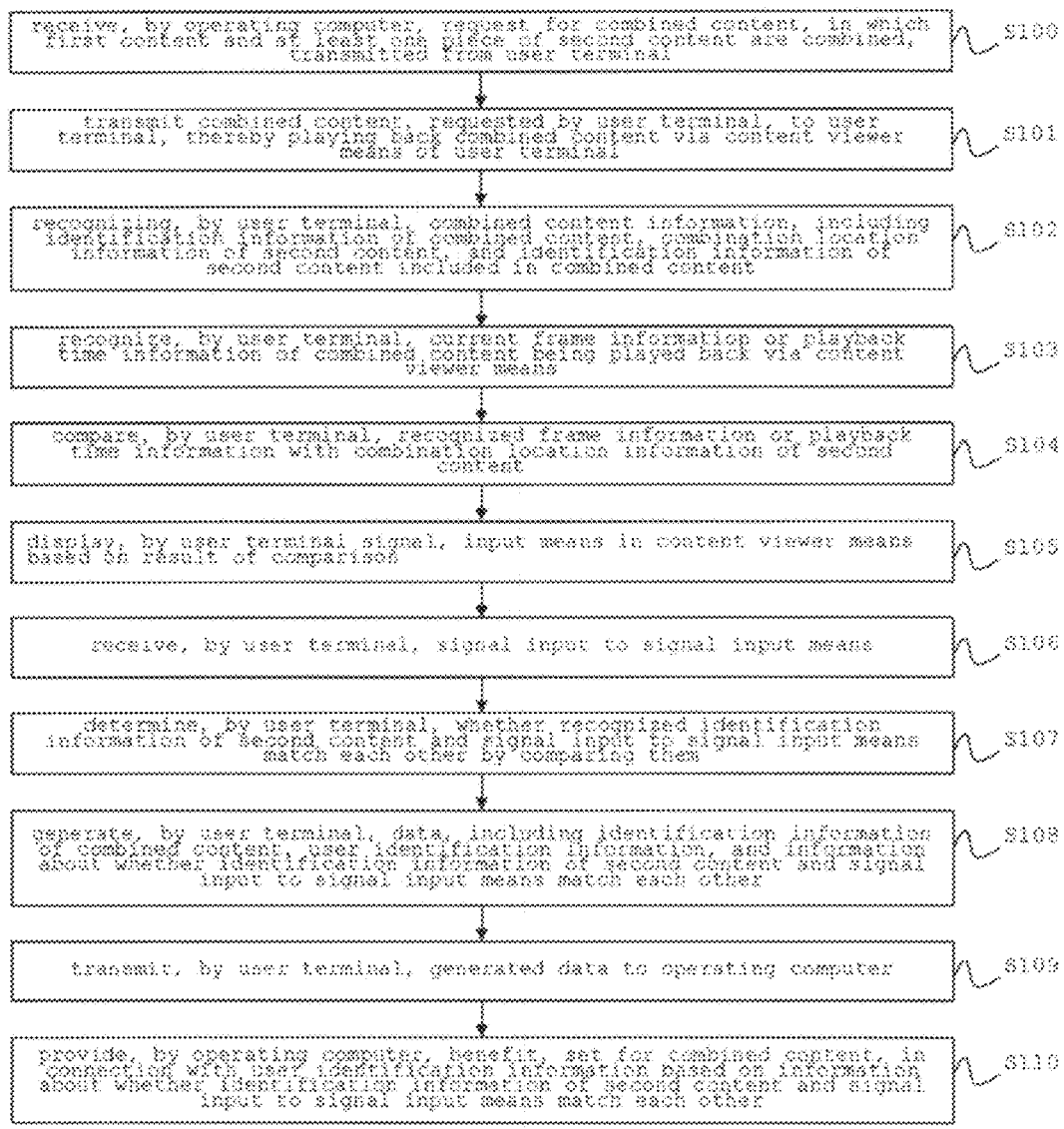
FIG. 7 is a flowchart illustrating a first embodiment of a method for checking the viewing of content according to the present invention.

FIG. 7 is a flowchart illustrating a first embodiment of a method for checking the viewing of content according to the present invention.

As shown in FIG. 7, the method for checking the viewing of content according to the present invention includes: step S100 of receiving, by the operating computer, a request for combined content, in which first content and at least one piece of second content are combined, transmitted from the user terminal; step S101 of transmitting the combined content, requested by the user terminal, to the user terminal, thereby playing back the combined content via the content viewer means of the user terminal; step S102 of recognizing, by the user terminal, combined content information, including the identification information of the combined content, the combination location information of the second content, and the identification information of the second content included in the combined content; step S103 of recognizing, by the user terminal, the current frame information or playback time information of the combined content being played back via the content viewer means; step S104 of comparing, by the user terminal, the recognized frame information or playback time information with the recognized combination location information of the second content; step S105 of displaying, by the user terminal signal, an input means in the content viewer means or a separate area based on the result of the comparison; step S106 of receiving, by the user terminal, a signal input to the signal input means, step S107 of determining, by the user terminal, whether the recognized identification information of the second content and the signal input to the signal input means match each other by comparing them; step S108 of, if the identification information of the second content and the signal input to the signal input means match each other, generating, by the user terminal, data, including the identification information of the combined content, user identification information composed of one of member information, the identification information of a user program and the identification information of the user terminal, and information about whether the identification information of the second content and the signal input to the signal input means match each other; step S109 of transmitting, by the user terminal, the generated data to the operating computer; and step S110 of providing, by the operating computer, a benefit, set for the combined content, in connection with the user identification information based on the information about whether the identification information of the second content and the signal input to the signal input means match each other, which is included in the data transmitted from the user terminal.

Figure 8:
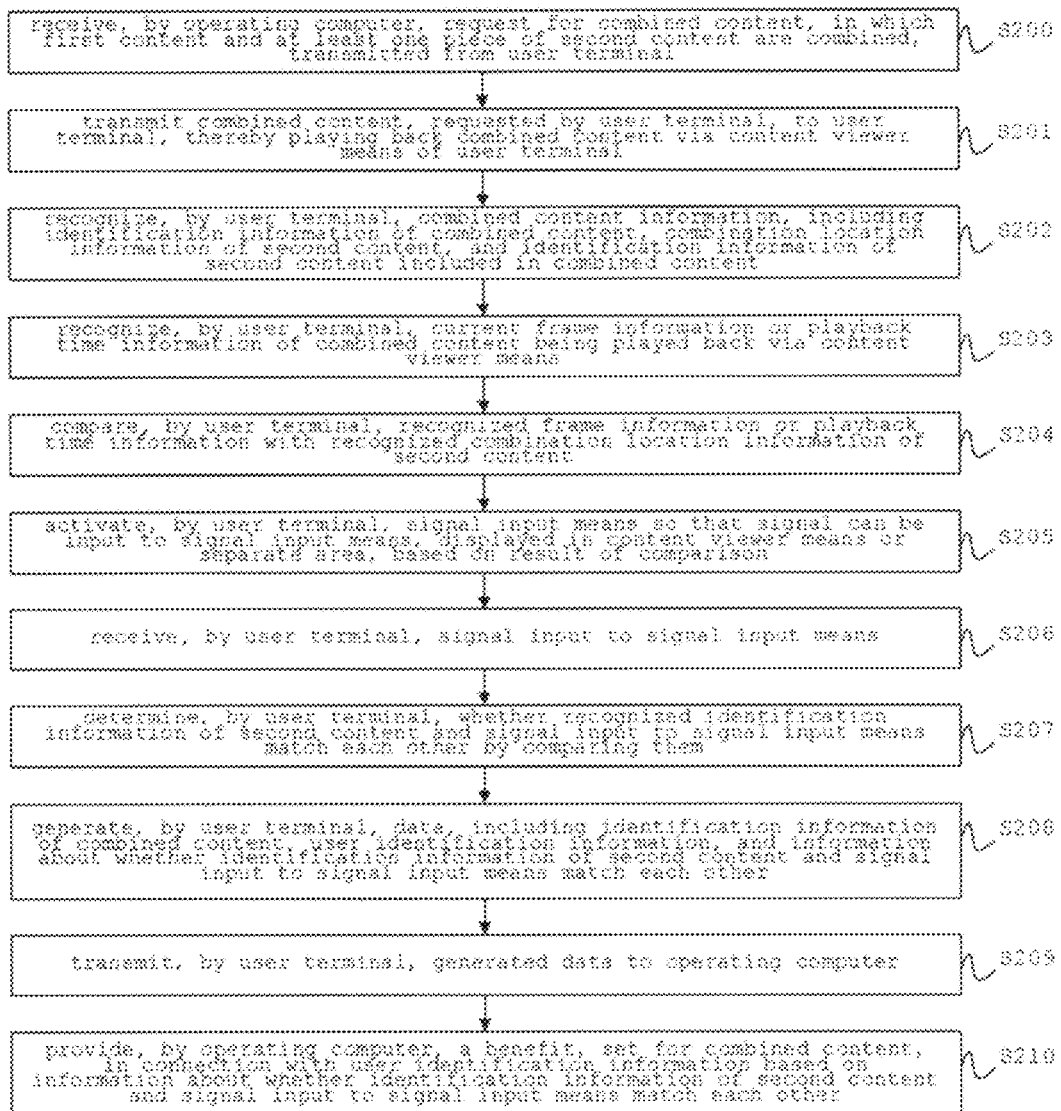
FIG. 8 is a flowchart illustrating a second embodiment of a method for checking the viewing of content according to the present invention.

FIG. 8 is a flowchart illustrating a second embodiment of a method for checking the viewing of content according to the present invention.

As shown in FIG. 8, the method for checking the viewing of content according to the present invention includes: step S200 of receiving, by the operating computer, a request for combined content, in which first content and at least one piece of second content are combined, transmitted from the user terminal; step S201 of transmitting the combined content, requested by the user terminal, to the user terminal, thereby playing back the combined content via the content viewer means of the user terminal; step S202 of recognizing, by the user terminal, combined content information, including the identification information of the combined content, the combination location information of the second content, and the identification information of the second content included in the combined content, step S203 of recognizing, by the user terminal, the current frame information or playback time information of the combined content being played back via the content viewer means; step S204 of comparing, by the user terminal, the recognized frame information or playback time information with the recognized combination location information of the second content; step S205 of activating, by the user terminal, a signal input means so that a signal can be input to the signal input means, displayed in the content viewer means or a separate area, based on the result of the comparison; step S206 of receiving, by the user terminal, a signal input to the signal input means; step S207 of determining, by the user terminal, whether the recognized identification information of the second content and the signal input to the signal input means match each other by comparing them; step S208 of, if the identification information of the second content and the signal input to the signal input means match each other, generating, by the user terminal, data, including the identification information of the combined content, user identification information composed of one of member information, the identification information of a user program and the identification information of the user terminal, and information about whether the identification information of the second content and the signal input to the signal input means match each other; step S209 of transmitting, by the user terminal, the generated data to the operating computer, and step S210 of providing, by the operating computer, a benefit, set for the combined content, in connection with the user identification information based on the information about whether the identification information of the second content and the signal input to the signal input means match each other, which is included in the data transmitted from the user terminal.

Figure 9:
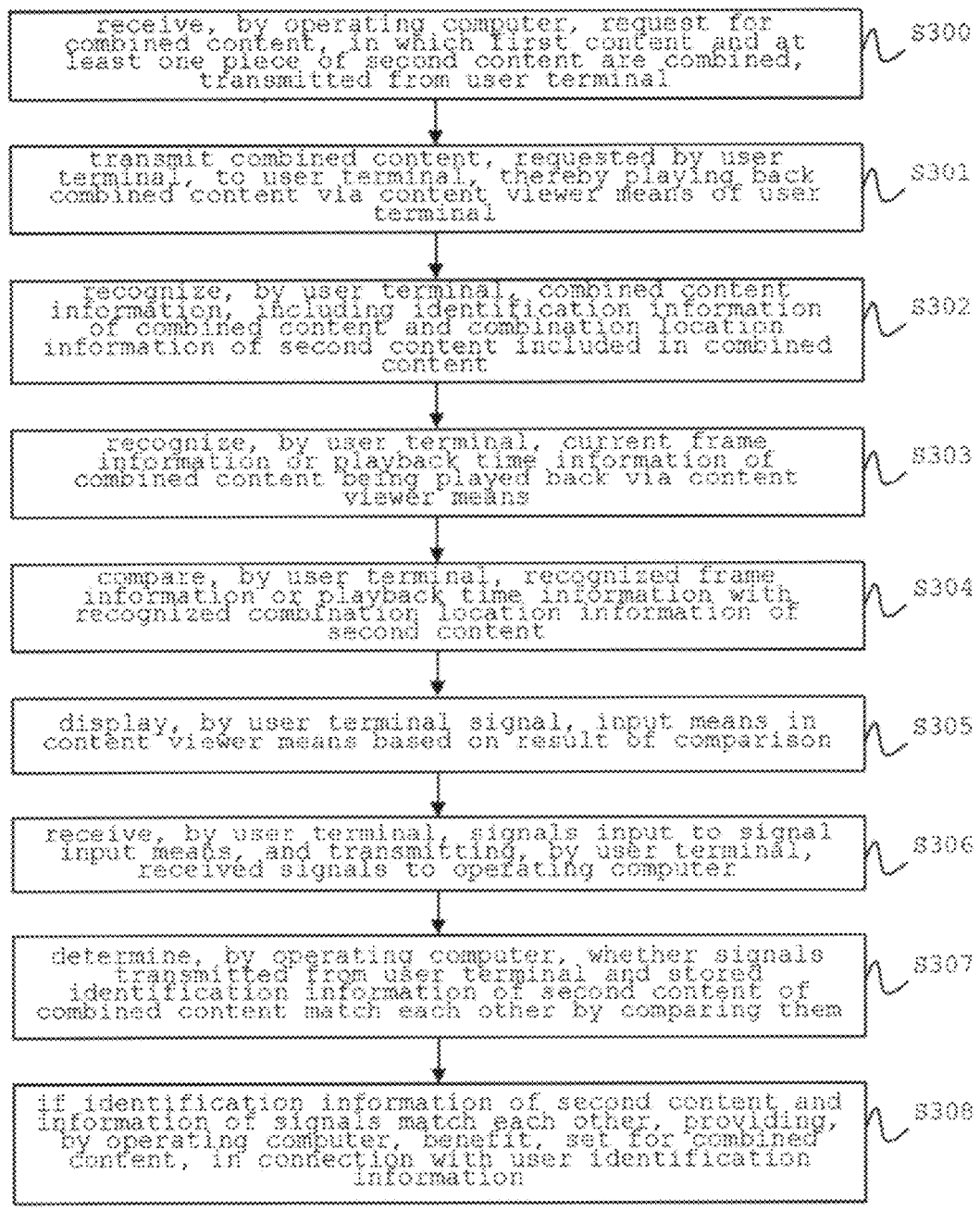
FIG. 9 is a flowchart illustrating a third embodiment of a method for checking the viewing of content according to the present invention.

FIG. 9 is a flowchart illustrating a third embodiment of a method for checking the viewing of content according to the present invention.

As shown in FIG. 9, the method for checking the viewing of content according to the present invention includes: step S300 of receiving, by the operating computer, a request for combined content, in which first content and at least one piece of second content are combined, transmitted from the user terminal, step S301 of transmitting the combined content, requested by the user terminal, to the user terminal, thereby playing back the combined content via the content viewer means of the user terminal; step S302 of recognizing, by the user terminal, combined content information, including the identification information of the combined content and the combination location information of the second content included in the combined content; step S303 of recognizing, by the user terminal, the current frame information or playback time information of the combined content being played back via the content viewer means; step S304 of comparing, by the user terminal, the recognized frame information or playback time information with the recognized combination location information of the second content; step S305 of displaying, by the user terminal signal, an input means in the content viewer means or a separate area based on the result of the comparison; step S306 of receiving, by the user terminal, signals input to the signal input means, and transmitting, by the user terminal, the received signals to the operating computer when a final signal is input; step S307 of determining, by the operating computer, whether information about the signals transmitted from the user terminal and the stored identification information of the second content of the combined content match each other by comparing them; and step S308 of, if the identification information of the second content and the information of the signals match each other, providing, by the operating computer, a benefit, set for the combined content, in connection with the user identification information.

Figure 10:
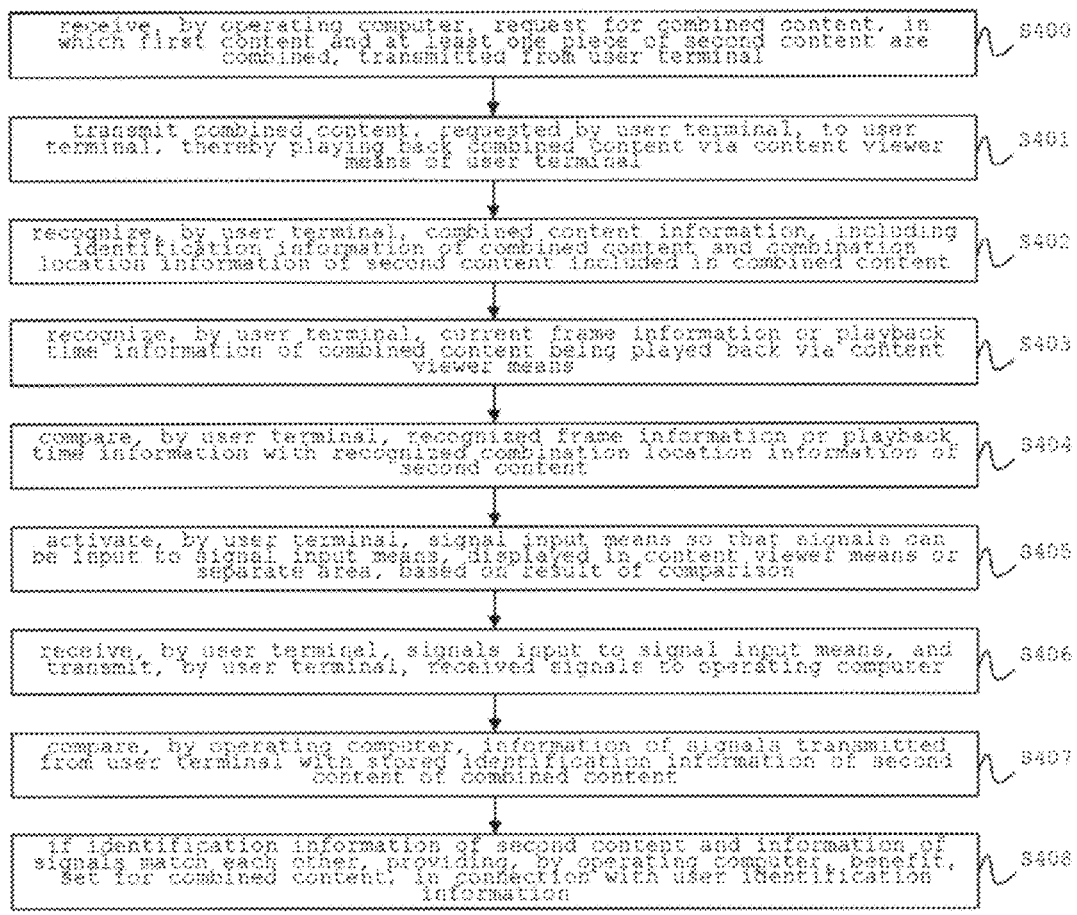
FIG. 10 is a flowchart illustrating a fourth third embodiment of a method for checking the viewing of content according to the present invention.

FIG. 10 is a flowchart illustrating a fourth third embodiment of a method for checking the viewing of content according to the present invention.

As shown in FIG. 10, the method for checking the viewing of content according to the present invention includes: step S400 of receiving, by the operating computer, a request for combined content, in which first content and at least one piece of second content are combined, transmitted from the user terminal; step S401 of transmitting the combined content, requested by the user terminal, to the user terminal, thereby playing back the combined content via the content viewer means of the user terminal; step S402 of recognizing, by the user terminal, combined content information, including the identification information of the combined content and the combination location information of the second content included in the combined content; step S403 of recognizing, by the user terminal, the current frame information or playback time information of the combined content being played back via the content viewer means; step S404 of comparing, by the user terminal, the recognized frame information or playback time information with the recognized combination location information of the Second content; step S405 of activating, by the user terminal, a signal input means so that signals can be input to the signal input means, displayed in the content viewer means or a separate area, based on the result of the comparison; step S406 of receiving, by the user terminal, signals input to the signal input means, and transmitting, by the user terminal, the received signals to the operating computer when a final signal is input; step S407 of determining, by the operating computer, whether the information of the signals transmitted from the user terminal and the stored identification information of the second content of the combined content match each other by comparing them; and step S408 of, if the identification information of the second content and the information of the signals match each other, Providing, by the operating computer, a benefit, set for the combined content, in connection with the user identification information.

The above-described embodiments of the present invention are merely some of various embodiments of the present invention. It will be apparent that various embodiments included in the technical spirit of the present invention, in which when combined content, in which first content composed of advertising moving image content and at least one piece of second content composed of an image, a voice or a moving image are combined, is played back via the content viewer means, an exposed second content-related signal input to the signal input means included in the content viewer means is received and then the operating computer allows a bonus, set for the combined content, to be accumulated for a viewer, are included in the range of protection of the present invention.

DESCRIPTION OF REFERENCE SYMBOLS

100: operating computer
200: member DB
300: combined content DB
400: statistical DB
500: content combination device
600: second content storage device
700: first content storage device
800: user program

The invention claimed is:

1. A system for checking viewing of content, comprising:
an operating computer connected to a server having a storage and a user program being executed on a user terminal communicatively connected to the operating computer,
wherein the operating computer includes:
a combined content management unit, located in either the operating computer or a server, for storing in the storage and managing at least one piece of combined content and information of the at least one piece of combined content, wherein first content as an advertisement and at least one piece of second content are combined into the at least one piece of combined content and provided to the user terminal;
a streaming management unit, located in either the operating computer or a server and communicating with the combined content management unit, for providing a streaming regarding the combined content requested by the user terminal;
a data management unit, located in either the operating computer or a server and communicating with the streaming management unit, for receiving data regarding viewing of the combined content from the user terminal and stores the data;
a data analysis unit, located in either the operating computer or a server and communicating with the data management unit, for receiving information related to the at least one piece of second content of the combined content transmitted from the user terminal, and analyzes whether there is a match by comparing with information about the at least one piece of second content included in the information of the combined content;
a data generation unit, located in either the operating computer or a server and communicating with the data management unit, for generating data including identification information of the combined content, information about matching of at least one second content and information set for the second content exposed, and user identification information composed of one of identification information of the user terminal, identification information of a viewer, and identification information of the user program;
a bonus management unit, located in either the operating computer or a server and communicating with the data generation unit, for querying and analyzing a bonus set based on the identification information of the combined content and the information about the matching of the at least one piece of second content included in the data generated by the data generation unit, and accumulating a bonus retrieved in connection with the user identification information; and
a statistics processing unit, located in either the operating computer or a server and communicating with the bonus management unit, for processing and viewing statistics regarding the at least one piece of combined content, viewer analysis statistics, and bonus statistics,
wherein the user program comprises:
a content viewer, communicating with the operating computer, for executing a streaming of the at least one piece of combined content provided by the operating computer;
a combined content information management unit, communicating with the content viewer, for storing and extracting the combined content information including the identification information of the combined content included in the combined content transmitted by the operating computer, the identification information of the at least one piece of second content, information about location of the first content where the at least one piece of second content is combined, and the bonus information included in the first content;
a signal input unit, communicating with the combined content information management unit, for allowing the viewer to input a signal related to the at least one piece of second content exposed when the at least one piece of second content included in the combined content being played is exposed;

a data analysis unit, communicating with the signal input unit, comparing the input signal to the signal input unit with the identification information of the at least one piece of second content stored in the combined content information managing unit to determine whether they match or not;

a data generation unit, communicating with the data analysis unit, if the input signal and the identification information of the at least one piece of second content match each other, for generating data including the identification information of the combined content, information about whether the input signal and the at least one piece of second content match each other, and user identification information composed of one of the identification information of the user terminal, identification information of the viewer, and the identification information of the user program; and a data communication unit, communicating with the data generation unit, for transmitting the generated data to the operating computer; and wherein the bonus management unit provides and displays on the operating computer for the user the bonus or the bonus set for the combined content being played in the content viewer, in connection with the identification information of the viewer based on the data that is transmitted from the user terminal.

2. The system of claim 1, wherein the first content is an image or moving image content, and the second content is one of an image, a voice and a moving image in which a letter, a number or a character is entered.

3. The system of claim 1, wherein the signal input unit is displayed along with the content viewer when the content viewer is executed on the user terminal.

4. The system of claim 1, wherein the signal input unit is displayed when, before or after the second content is exposed in the combined content being played in the content viewer.

5. The system of claim 1, wherein a first mark related to the second content and a second mark unrelated to the second content are displayed together in the signal input unit, and the input signal to the signal input unit is a signal that selects the first mark or second mark.

6. The system of claim 1, wherein a first mark related to the second content and a second mark unrelated to the second content are displayed together in the signal input unit, and a signal is input when only the first mark is selected.

7. The system of claim 1, wherein the bonus set for the combined content is one of an electronic bonus, an electronic point, cyber money, and an electronic coupon.

8. The system of claim 1, wherein the user program has combination location information of the at least one piece of second content that is combined with the first content.

9. The system of claim 3, wherein the signal input unit is deactivated to prevent a signal from being input in terms of a program when or after the exposed second content disappears.

10. The system of claim 4, wherein the signal input unit disappears when or after the exposed second content disappears.

11. The system of claim 8, wherein the combination location information of the second content is playback time information or frame information of the combined content.

12. A system for checking viewing of content, comprising: an operating computer including a storage and a user program being executed on a user terminal communicatively connected to the operating computer with a method for viewing of content, comprising:

Receiving, by an operating computer, a request for combined content, in which first content related to an advertisement and at least one piece of second content which is used in confirming viewing of the first content are combined, from a user terminal;

transmitting the combined content, requested by the user terminal, to the user terminal;

playing the combined content in a content viewer of the user terminal;

recognizing, by the use terminal, combined content information including identification information of the combined content, combination location information of the second content and identification information of the second content included in the combined content;

displaying, by the user terminal, a signal input unit in the content viewer or in a different area based on the combination location information of the second content, or activating, by the user terminal, the signal input unit based on the combination location information of the second content so that a signal can be input to the signal input unit displayed when the content viewer is executed;

receiving, by the user terminal, the input signal to the signal input unit;

comparing, by the user terminal, the recognized identification information of the second content with information of the input signal in the signal input unit;

if the identification information of the second content and the information of the input signal in the signal input unit match each other, generating, by the user terminal, data including the identification information of the combined content, user identification information composed of one of identification information of the user terminal, identification information of a viewer, and identification information of the user program, and information about whether the input signal and the at least one piece of second content match each other;

transmitting, by the user terminal, the generated data to the operating computer; and providing, by the operating computer, a bonus set for the combined content, in connection with the identification information of the viewer based on the matching information of the input signal and the identification information of the second content.

13. The method for viewing of content of claim 12, further comprising: storing the combined content information including the identification information of the combined content included in the combined content transmitted by the operating computer, the identification information of the at least one piece of second content, information about location of the first content where the at least one piece of second content is combined, and the bonus set.

14. The method for viewing of content of claim 12, further comprising: storing and extracting the combined content information including the identification information of the combined content included in the combined content transmitted by the operating computer, the identification information of the at least one piece of second content, information about location of the first content where the at least one piece of second content is combined, and the bonus set.

15. The method for viewing of content of claim 13, further comprising: displaying the bonus set for the combined content being played in the content viewer, in connection with the identification information of the viewer based on the data that is transmitted from the user terminal.

16. The method for viewing of content of claim 15, further comprising: inputting a signal related to the at least one piece of second content exposed when the at least one piece of second content included in the combined content being played is exposed.

* * * * *